Figure 3:
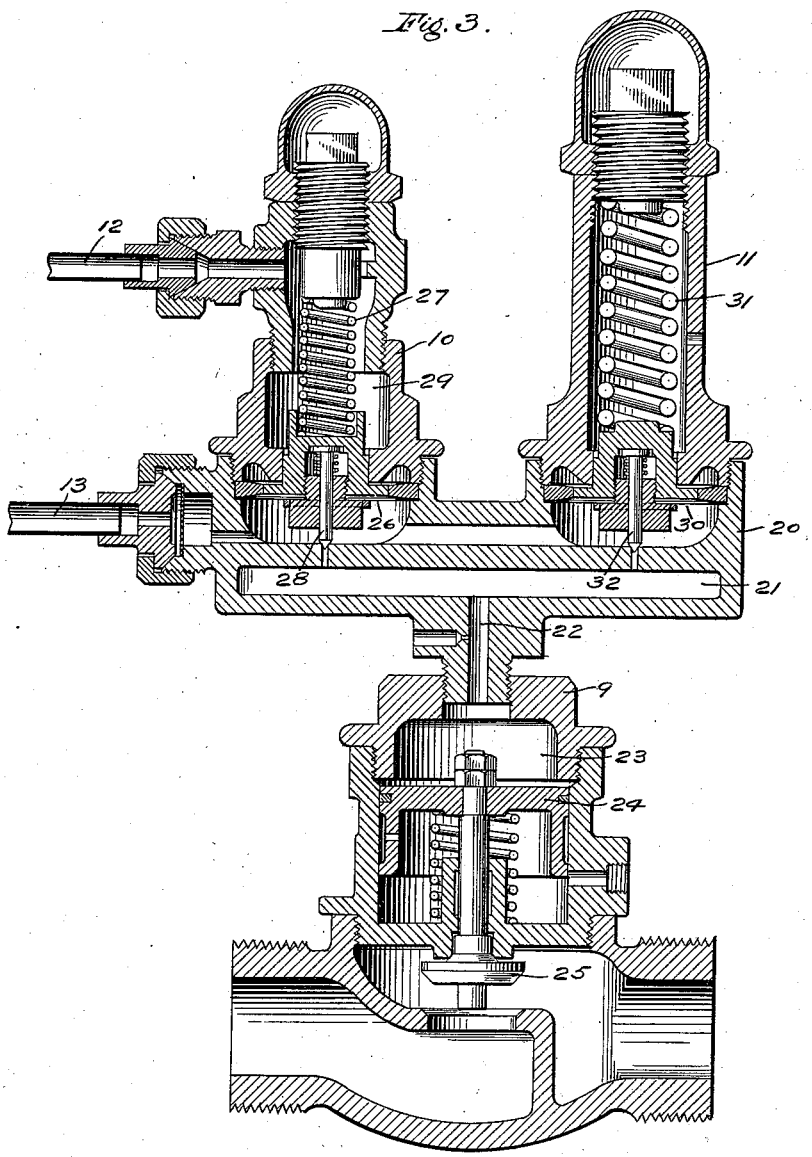

H. M. P. MURPHY.
DUPLEX PRESSURE CONTROL APPARATUS.
APPLICATION FILED MAY 28, 1907.
1,015,824.
Patented Jan. 30, 1912.
2 SHEETS—SHEET 1.
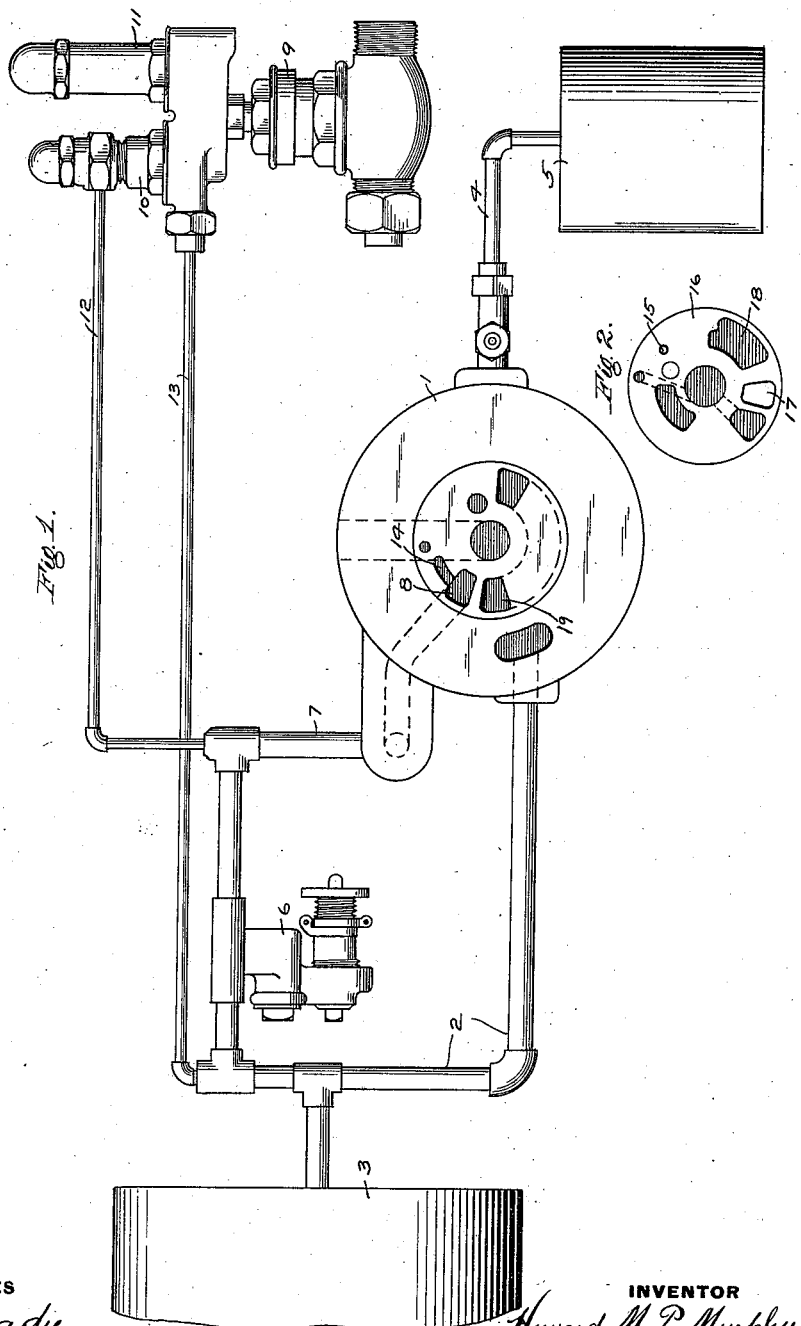
WITNESSES
INVENTOR H. M. P. MURPHY.
DUPLEX PRESSURE CONTROL APPARATUS.
APPLICATION FILED MAY 28, 1907.

1,015,824.

Patented Jan. 30, 1912.

2 SHEETS—SHEET 2.

WITNESSES

INVENTOR
Howard M. P. Murphy
by E. Wright
Att'y.

UNITED STATES PATENT OFFICE.

HOWARD M. P. MURPHY, OF PITTSBURGH, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

DUPLEX PRESSURE-CONTROL APPARATUS.

1,015,824.   Specification of Letters Patent.   Patented Jan. 30, 1912.

Application filed May 28, 1907. Serial No. 376,168.

*To all whom it may concern:*

Be it known that I, HOWARD M. P. MURPHY, a citizen of the United States, residing at Pittsburgh, in the county of Allegheny and State of Pennsylvania, have invented new and useful Improvements in Duplex Pressure-Control Apparatus, of which the following is a specification.

This invention relates to fluid pressure brakes, and more particularly to duplex pressure control apparatus.

In the running of railway trains, it is often desirable to operate the air brake system, at one time at the ordinary or low degree of pressure, such as a maximum main reservoir pressure of 90 pounds per square inch, and a maximum train pipe pressure of 70 pounds per square inch, and, at another time, at a much higher degree of pressure, such as a maximum main reservoir pressure of 120 or more pounds per square inch, and a maximum train pipe pressure of 110 pounds per square inch, as in high speed service. For this purpose it has been proposed to provide means for automatically adjusting the pressure governor to give the desired degree of maximum reservoir pressure when the feed valve mechanism is adjusted to any corresponding degree of train pipe pressure. The above construction operates to supply fluid under pressure, preferably at train pipe pressure, to the adjustable load side of the diaphragm of the pressure governor, so that the load on the governor diaphragm automatically varies according as the maximum degree of train pipe pressure is adjusted. It is highly desirable that the air pump should operate to compress air to a high degree of pressure at times when the brakes are applied, in order that the main reservoir will be well supplied with compressed air, in readiness for releasing the brakes, and for accomplishing this result, it has further been proposed to provide a duplex pressure governor, wherein the fluid under pressure from the main reservoir to the low pressure diaphragm, is governed by the engineer's brake valve, so that, when the brake valve is in a brake applied position, fluid at main reservoir pressure is cut off from the low pressure diaphragm and the pump is then governed according to the higher pressure of the high pressure governor.

The principal object of my invention is to provide an improved apparatus adapted to accomplish the above functions, wherein the pipe connection between the brake valve and the loaded side of the pressure governor is eliminated and the construction otherwise simplified, as will appear in the more detailed description of my invention, hereinafter more fully set forth.

Though adapted to general use, my invention is more particularly adapted for equipments in which the brake valve is provided with two main reservoir connections, one direct, and the other containing a feed valve mechanism for supplying fluid to the train pipe at a predetermined degree of pressure less than maximum main reservoir pressure.

In the accompanying drawing, Figure 1 is a diagrammatic view in elevation, with the engineer's brake valve in plan view, of a standard engine brake equipment, with my invention applied thereto; Fig. 2 a face view of the rotary valve of the engineer's brake valve, showing the arrangement of its ports and cavities; and Fig. 3 a central sectional view of the duplex pressure governor employed in connection with my improvement.

The engine brake equipment comprises, as shown in Fig. 1 of the drawings, an engineer's brake valve 1, connected by pipe 2 with a main reservoir 3, and by pipe 4 with an equalizing reservoir 5. A duplex feed valve mechanism 6 is interposed between main reservoir pipe 2 and pipe 7 leading to a port in the rotary valve seat of the engineer's brake valve 1. The above described apparatus may be of the usual standard construction, and also comprises a duplex pressure control mechanism 9, having the usual low and high pressure heads 10 and 11 respectively.

As shown in Fig. 3 of the drawings, the duplex pressure governor 9 may comprise a Siamese fitting 20 having chamber 21 communicating through a passage 22 with a chamber 23 on one side of piston 24, said piston being adapted to operate the steam throttle valve 25 for controlling the admission of steam to the air pump. The low pressure head 10 comprises a diaphragm 26 subject on one side to the pressure of an adjustable spring 27 and on the opposite side to main reservoir pressure admitted thereto through pipe 13 and a valve 28 operated by said diaphragm for controlling the admission of air to chamber 21. A pipe 12 connected to the feed valve pipe 7 opens into the spring chamber 29 of pressure head 10. The high pressure head 11 comprises a diaphragm 30 subject on one side to main reservoir pressure and on the opposite side to the pressure of an adjustable spring 31 and a valve 32 operated by the diaphragm 30 for controlling the admission of air to chamber 21.

In the present construction as above described, the spring chamber of the low pressure head is connected with a source of fluid pressure, so that the load due to the regulating spring is augmented by a fluid pressure load, and furthermore, this fluid under pressure being supplied from the feed valve pipe 7, the fluid pressure load on the low pressure diaphragm 26 will consequently vary according to the degree of pressure of the fluid supplied to the brake valve through the pipe 7. The usual feed port 8 for supplying air to the train pipe when the brake valve is in running position is provided with an extension 14, adapted to register with a through port 15 in the rotary valve 16, in lap and service application positions.

In full release position of the engineer's brake valve, the train pipe passage 19 is open through the usual port 17, in the rotary valve, to reservoir pressure, and the feed port 8 is closed, so that the diaphragm 26 of the low pressure head 10 is then subject to such degree of fluid pressure as the feed valve mechanism may be adjusted to. In running position the feed valve port 8 is connected by cavity 18, in the rotary valve, to the train pipe passage 16, and the low pressure diaphragm is then subjected to fluid at train pipe pressure. In lap and service application positions, the additional through port 15 registers with the extension 14 of the feed port 8, and fluid at main reservoir pressure flows from the chamber above the rotary valve, to the pipe 7 and thence by pipe 12 to the low pressure head 10. Consequently, in these positions, the main reservoir pressure constantly acting on the opposite side of the regulating diaphragm is balanced by the main reservoir pressure supplied to the spring chamber 29 of the diaphragm, and said diaphragm is consequently maintained in its inner position by the regulating spring 27, so that the pressure head is then cut out of active operation, as will be readily understood. So also in emergency position, the port 15 is open to the feed port 8, and the low pressure head 10 thereby cut out. When the low pressure head is thus cut out out of active operation, the high pressure head governs the pump, which, of course, insures that the pump will operate fully and compress air up to the maximum degree at which the high pressure head 11 may be adjusted. It will now be apparent that I have provided a simple apparatus in which the pump governor automatically operates to cause the pump to compress air at a high rate when the brakes are applied, so that a full supply of compressed air is assured in readiness for releasing the brakes, while in running and release positions, the governor regulates the pump so as to maintain the main reservoir pressure according to the maximum degree of train pipe pressure for which the feed valve may be adjusted.

Having now described my invention, what I claim as new, and desire to secure by Letters Patent is:—

1. In a fluid pressure brake, the combination with a main reservoir, engineer's brake valve, and train pipe, of a pressure governor having a diaphragm subject on one side to main reservoir pressure, said brake valve being adapted to control the admission of fluid pressure to the opposite side of said diaphragm.

2. In a fluid pressure brake, the combination with a main reservoir, engineer's brake valve, and train pipe, of a pressure governor having a diaphragm subject on one side to main reservoir pressure, and on the opposite side to fluid varying with train pipe pressure, said brake valve being adapted to control the admission of fluid from another source to said opposite side of the diaphragm.

3. In a fluid pressure brake, the combination with a main reservoir, engineer's brake valve, and train pipe, of a pressure governor having a diaphragm subject on one side to main reservoir pressure, and on the opposite side to train pipe pressure, said brake valve having ports for admitting fluid under pressure to said opposite side of the diaphragm.

4. In a fluid pressure brake, the combination with a main reservoir, engineer's brake valve, and train pipe, of a pressure governor having a diaphragm subject on one side to main reservoir pressure, and on the opposite side to train pipe pressure, said brake valve having ports for admitting fluid at main reservoir pressure to said opposite side of the diaphragm.

5. In a fluid pressure brake, the combination with a main reservoir, engineer's brake valve, and train pipe, of a pressure governor having a diaphragm subject on one side to main reservoir pressure, and on the opposite side to train pipe pressure, said brake valve having ports for admitting fluid at main reservoir pressure to said opposite side, when said brake valve is in a brake applied position.

6. In a fluid pressure brake, the combination with a main reservoir, engineer's brake valve, and train pipe, of a pressure governor having a diaphragm subject on one side to main reservoir pressure, a load device acting on the opposite side of said diaphragm, an adjustable feed valve mechanism for regulating the normal degree of train pipe pressure, means for supplying fluid at train pipe pressure to said loaded side of the diaphragm, said brake valve having ports for admitting fluid at main reservoir pressure to said loaded side of the diaphragm in a brake applied position thereof.

7. In a fluid pressure brake, the combination with a main reservoir, engineer's brake valve, and train pipe, of a duplex pressure governor having two diaphragms subject on one side to main reservoir pressure, and on the opposite side to load devices, said brake valve being adapted to control the admission of fluid under pressure to the loaded side of one of said diaphragms.

8. In a fluid pressure brake, the combination with a main reservoir, engineer's brake valve, and train pipe, of a duplex pressure governor having two diaphragms subject on one side to main reservoir pressure, and on the opposite side to load devices, the loaded side of one of said diaphragms being subject to fluid at train pipe pressure, and said brake valve being adapted to admit fluid at main reservoir pressure thereto.

9. In a fluid pressure brake, the combination with a main reservoir, engineer's brake valve, and train pipe, of a duplex pressure governor having two diaphragms subject on one side to main reservoir pressure, and on the opposite side to load devices, the loaded side of one of said diaphragms being subject to fluid at train pipe pressure, and said brake valve being adapted to admit fluid at main reservoir pressure thereto, when in a brake applied position.

10. In a fluid pressure brake, the combination with a main reservoir, engineer's brake valve, and train pipe, of a duplex pressure governor having two diaphragms subject on one side to main reservoir pressure, and on the opposite side to load devices, an adjustable feed valve mechanism for regulating the normal degree of train pipe pressure, means for supplying fluid at train pipe pressure to said loaded side of one of said diaphragms, and said brake valve having ports for admitting fluid at main reservoir pressure to the fluid pressure loaded side of said diaphragm in a brake applied position thereof.

11. In a fluid pressure brake, the combination with a main reservoir, a pressure governor therefor, and a train pipe, of a brake valve having two main reservoir connections, one containing a feed valve mechanism, and a connection to the loaded side of said pressure governor from the feed valve supply pipe, intermediate the feed valve and brake valve, said brake valve having ports for admitting fluid at main reservoir pressure to said pressure governor in certain positions thereof.

12. In a fluid pressure brake, the combination with a main reservoir, a pressure governor therefor, and a train pipe, of a brake valve having two main reservoir connections, one containing a feed valve mechanism, and a connection to the loaded side of said pressure governor from the feed valve supply pipe, intermediate the feed valve and brake valve, said brake valve having ports for admitting fluid at main reservoir pressure to said pressure governor in a brake applied position thereof.

13. In a fluid pressure brake, the combination with a main reservoir and train pipe, of a pressure governor having a diaphragm subject on one side to main reservoir pressure, and a brake valve for controlling the admission of fluid pressure to the opposite side of the diaphragm.

14. In a fluid pressure brake, the combination with a main reservoir and a pump for compressing fluid into said reservoir, of a duplex pressure governor for controlling said pump having two diaphragms constantly subject on one side to main reservoir pressure, the opposite side of one diaphragm being subject to fluid pressure and a spring.

In testimony whereof I have hereunto set my hand.

HOWARD M. P. MURPHY.

Witnesses:
R. F. EMERY,
WM. M. CADY.

Copies of this patent may be obtained for five cents each, by addressing the "Commissioner of Patents. Washington, D. C."